Feb. 26, 1946.   O. S. PETTY   2,395,427
SEISMIC SURVEYING
Filed April 7, 1941

Inventor
Olive S. Petty
By Watson, Cole, Grindle & Watson
Attorney

Patented Feb. 26, 1946

2,395,427

UNITED STATES PATENT OFFICE 2,395,427

SEISMIC SURVEYING

Olive S. Petty, San Antonio, Tex.

Application April 7, 1941, Serial No. 387,331

19 Claims. (Cl. 177—352)

This invention relates to methods of and apparatus for conducting seismic surveys for use in connection with geophysical prospecting, and more particularly to apparatus and methods for amplifying and recording the seismic wave trains as they arrive at a receiving station, following the creation and propagation of these waves in the earth by the firing of a charge of explosive at or near the earth's surface.

It is a general object of the present invention to provide novel and improved apparatus for and methods of amplifying and recording the arrival times of waves which are received over a period of several seconds and exhibit during that time various intensities or amplitudes, the ratio of the highest to the lowest amplitude being relatively large.

Thus it is well recognized that certain higher energy waves may arrive at the receiving station with an intensity of the order of 600 times as great as certain other waves, and it is also noted that during a period following the reception of waves of high amplitude, the wave-form energy is gradually attenuated over an appreciable period, usually decaying rather uniformly with time. Thus in order that waves of widely varying amplitude may all be received and recorded by sensitive apparatus on a record sheet or other medium of convenient dimensions, it is highly essential that some means be provided to bring the waves, or the energy derived therefrom, to levels not greatly differing throughout the total time of wave reception.

With this end in view, it is an object of the instant invention to provide seismic apparatus characterized by a range of sensitivity such that on the reception of wave energy of high amplitude, the level at which such energy is recorded may be maintained within usable limits. It is a further object of the invention to provide means for gradually increasing the level at which the energy is recorded during periods of attenuation or decay of the wave trains.

It is a feature of the invention that the extent to which the sensitivity of the apparatus may be varied, as well as the period during which gradual increase in sensitivity is effected, may be predetermined with reasonable accuracy.

More specifically, it is an object of the invention to provide, in apparatus of the character described and in association with a seismometer or other device for converting seismic waves or impulses into electrical wave-form energy, an amplifying and recording device of which the sensitivity may be varied over a wide range and which may be so adjusted that the sensitivity will gradually increase over a definite and predetermined period of time to compensate for attenuation or decay of signals.

In a preferred form of the invention, it is proposed to employ a galvanometer in such a device including a field winding having such self-inductance that the magnetic field established thereby builds up comparatively slowly when the winding is energized. Thus when little or no energizing current is supplied to the winding, the sensitivity of the galvanometer is correspondingly low, and a satisfactory record of high amplitude signals can be obtained. Energization of the field winding following the reception of high amplitude signals effects gradual increase in the sensitivity of the galvanometer during the period of subsequent signal attenuation, so as to maintain the record at a usable level. An adjustable resistance included in series with the field winding, together with means for adjusting the potential applied by the source of energizing current, affords an arrangement whereby the rate at which the field builds up, as well as the ultimate value of the field, can be readily adjusted and predetermined.

A further object of the invention is the provision of novel and improved apparatus for and methods of amplifying and recording seismic waves so as to discriminate between wave energy of different frequencies to the end that desired components of the energy will be emphasized on the record.

In this connection it may be pointed out that in general the frequency of the earlier arriving reflected wave energy is appreciably higher than the frequency of later arriving reflected energy, a gradual reduction in frequency occurring as the seismic waves travel through or along the transmitting medium. To state the matter in another way, seismic impulses tend in general to acquire lower frequencies with the expiration of time, the waves reflected from relatively shallow beds being of higher frequency than those reflected from deeper beds, which normally require greater time to reach the detecting instrument. Since it is desired to emphasize on the record the components of the energy which represent reflected waves, and to minimize components from other sources, it is proposed as part of the instant invention to modify the frequency response of the energy receiving and recording system with respect to time, preferably in such a manner that during the taking of a record, the response to energy of low frequency is gradually increased with respect to the response to energy of higher frequency.

It is accordingly an object of the invention to provide apparatus for the reception and recording of seimic energy which is automatically controlled in a predetermined relation with time so as to discriminate between different frequencies and to favor at any given instant a band of frequencies which includes the frequencies of the reflected energy arriving at that instant.

A further object of the invention is the provision of means for automatically varying the frequency response of seismic apparatus over a predetermined time interval, such means being adjustable in advance to regulate either the length of the interval, the rate of variation of frequency response, or both.

Preferably the apparatus employed for this purpose is similar to that generally described hereinbefore as useful to effect compensation for attenuation of the received energy. Thus I may employ, in combination with other suitable equipment, a recording galvanometer with a varying field, having associated therewith means for controlling the rate at which the galvanometer field builds up during the reception of signal energy. As the galvanometer field increases, the electrical damping of the movable element thereof, produced by the motion of the element in the field, increases much more rapidly for movements of high than of low frequency. Consequently, the relative amplitude of displacement of the movable element in response to impulses of comparable magnitude but different frequency is altered, and the record of such low frequency impulses is increased in amplitude with respect to the record of impulses of higher frequency as the field strength increases.

Further objects and features of the invention will be apparent from the following description taken in connection with the accompanying drawing, in which Figure 1 is a diagrammatic representation of essential elements of seismic apparatus to which the instant invention may be applied;

In order to facilitate an understanding of the invention, reference will be made to the several embodiments thereof illustrated in the accompanying drawing and specific language will be employed. It will nevertheless be understood that various further modifications of the devices illustrated herein, such as would fall within the province of those skilled in the art to construct are contemplated as part of the present invention. This application is a continuation-in-part of my prior applications, Serial No. 290,929, filed August 18, 1939, now abandoned; Serial No. 335,-389, filed May 15, 1940, now Patent 2,365,285, dated December 19, 1944; and Serial No. 378,115, filed February 8, 1941, now abandoned.

Figure 1:
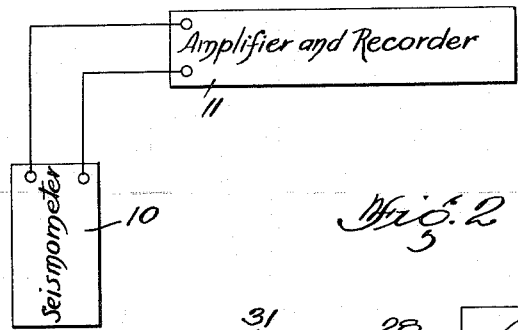

In Figure 1 is shown diagrammatically the essential elements of apparatus for the reception and recording of seismic impulses, this apparatus including a seismometer 10, whereby the seismic waves or impulses are converted into electrical wave-form signals, and amplifying and recording means 11 for the signal output of the seismometer. The association of the illustrated units of the apparatus is conventional, and the nature of these units may vary widely. For example, the seismometer may be constructed as disclosed in either of my prior applications, Serial No. 324,-013, filed March 14, 1940, now abandoned, or Serial No. 318,739, filed February 13, 1940, now Patent 2,348,225, dated May 9, 1944. The amplifying and recording unit may be of any conventional type adapted to amplify electrical waveform signals, for example, a thermionic valve amplifier, and to effect a record of the signal energy. The novelty in the instant invention resides in means for imparting to this apparatus a variable sensitivity for the purpose hereinbefore set forth.

Figure 2:
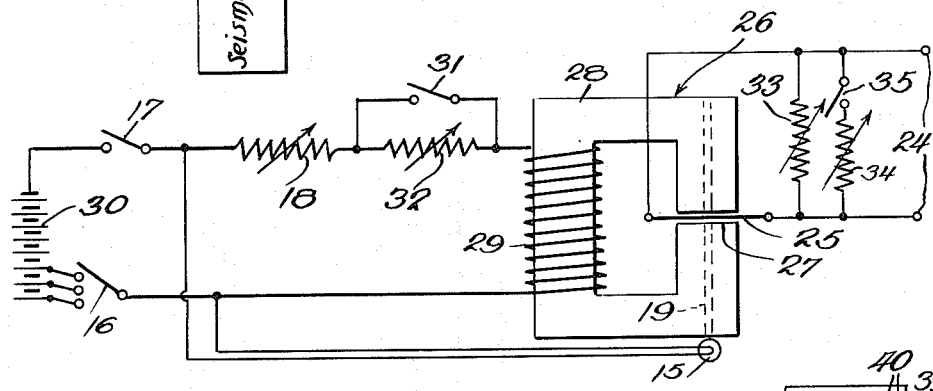
Figure 2 is a diagrammatic representation of one method of applying the invention to the apparatus shown in Figure 1.

Preferably the sensitivity of the receiving apparatus is varied by means associated with the amplifying and recording unit, for example such as is illustrated more particularly in Figure 2 of the drawing. Thus this figure illustrates schematically a string galvanometer, the latter being indicated generally at 26; a galvanometer of the multiple string type is preferably used, although for convenience only one string and the associated circuit is shown. The signal output of the seismometer 10, after suitable preliminary amplification by thermionic valve circuits, not shown, is supplied to the input terminals 24 for the string 25 of the galvanometer. Deflection of the string 25 in response to variation in signal energy is preferably recorded photographically on a suitable chart by means of an optical system of more or less conventional form, the optical system including a lamp or other light source 15 which projects a light beam past the string 25. A strip or sheet of sensitized paper, not shown, is driven at a predetermined linear speed transversely of the optical system, and the shadow cast by the string 25 is recorded thereon. The string 25 is disposed in the small air gap 27 of the soft iron core, or other suitable magnetic material, or field magnet 28 of the galvanometer, a portion of which is wound as at 29 with a suitable field winding adapted to be energized by direct current from a battery or other source 30. Associated with the battery 30 is a voltage control switch 16, or other suitable voltage control means, whereby the potential supplied by the battery may be varied as desired. The lamp 15 is energized from the battery 30 on the closing of a main switch 17, and the light beam is projected through a slot 19 in the magnet pole pieces. In series with the battery 30 and the winding 29 is a variable resistance 18, which may be adjusted to alter the period required to build up the galvanometer field to the maximum value, as hereinafter more fully explained. A second variable resistance 32 is also included in series in the circuit, a switch 31 being arranged in shunt with the resistance 32 for the purpose of shorting the latter.

Arranged in shunt with the galvanometer string 25 are variable resistances 33 and 34, the latter being in series with a manually operable switch 35.

In the operation of the apparatus shown herein, the switch 17 is first closed to energize the lamp 15 so that a shadow of the string 25 is cast on the moving record sheet as hereinbefore explained. The resistance 32 having been initially set to a relatively high value, only a small or negligible current flows in the field winding 29, and the field in which the string 25 vibrates is largely the result of residual magnetism in the core 28, although this initial field may, of course, be increased by manipulation of the resistance 32. When high intensity seismic impulses arrive, the operator, by visual observation of the record sheet watches the amplitude of swing of the galvanometer string 25, and as soon as reduction of amplitude commences, indicating the end of the reception of high intensity energy, he closes the switch 31 to increase the field strength of the galvanometer and opens the switch 35 to permit more energy from the amplifier to reach the galvanometer string.

The time in which the current in the winding 29 and hence the magneto-motive force of the field builds up following the closing of switch 31 is a function of the self-inductance of the winding which is, of course, dependent on the size and number of turns as well as on the shape, size, and magnetic characteristics of the core 28. It is possible to determine initially the self-inductance of the field so as to compensate to a reasonable extent for signal strength attenuation, thus maintaining the trace of the received waves at a usable level. However, the time required to build up the field to the maximum intensity, as well as the value of the ultimate intensity, may readily be varied to meet operating conditions.

Figure 4:
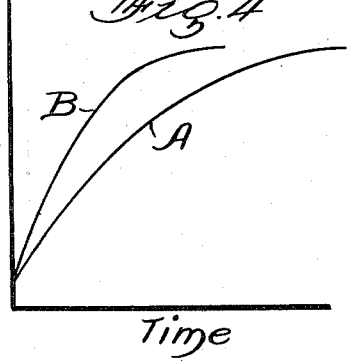
Figures 4 and 5 are graphic representations illustrative of the function of the structure shown in Figures 2 and 3.

Thus, referring to Figure 4, it will be observed that the variation in field current with respect to time following the closing of switch 31 is represented by curves A and B. Curve A represents the rate of increase in the field current, when the resistance 18 has been adjusted to a very small value or to zero; curve B indicates the rate of increase in the field current when the resistance 18 has been adjusted to a higher value. It will be noted that as the resistance 18 is increased (with corresponding increase in the potential applied by source 30) the rate of increase of the field current from the minimum value is correspondingly increased.

It will be appreciated that in order to obtain curves such as are represented at A and B in Figure 4, some adjustment of the potential delivered by the battery 30 may be required in order that the final value of the field current may be the same regardless of the setting of the resistance 18. Thus if the resistance 18 is increased, and it is desired that the ultimate value of the field current shall not be less, the switch 16 must be operated to select an appropriate potential in order to compensate for the voltage drop across the resistance 18.

It will be observed that the curves A and B are of generally logarithmic form; the equation for this type of curve may be expressed as follows:

$$i = \frac{E}{R}\left[1 - \epsilon^{-\frac{R}{L}t}\right]$$

where $i$ is the field current at the end of time $t$ after the closing of the switch 31, E is the voltage applied by the source 30, R is the total D. C. resistance in the circuit, L is the inductance of the field winding 29, and $\epsilon$ is a constant $$\left(\frac{1}{\epsilon} = .362\right)$$

Figure 5:
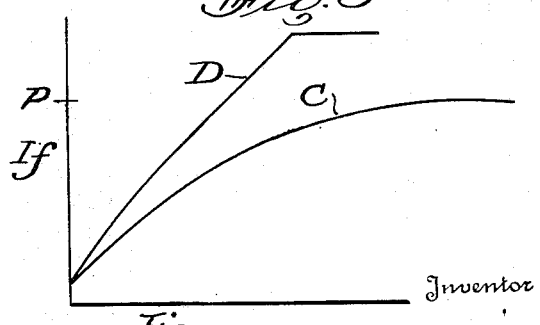

However, the foregoing holds true where flux increases linearly with current only if the ultimate value of the field current is less than that required to saturate the core, and under some circumstances it may be desirable, in order further to vary the time curve, to exceed the saturation point. Thus Figure 5 shows two curves representing increase in field current with time in which curve C, corresponding generally to curve A of Figure 4 represents the increase in field current when the saturation point is not exceeded, and curve D represents the increase of the field current when the current at the saturation point P is considerably less than the ultimate value of the field current. It will be noted that curve D rises much more rapidly after the saturation point is passed, being generally linear. The saturation point may, of course, be established wherever desired by proper selection of the material of which the core is formed. For example, Permalloy or Mumetal, mild steel, and Swedish iron establish saturation points of increasing current magnitude in the order named. Furthermore, by the selection of different materials for the core, as well as by variation of the shape of the pole pieces, the inductance of the field may be varied over a wide range, with consequent variation in the rate of increase of the field current, so that any desired shape of curve can be established in this manner in conjunction with adjustment of the variable resistance 18 and regulation of the applied voltage at the source 30. It may be mentioned that when the saturation point is exceeded, as in curve D of Figure 5, the final magnetic flux in the air gap between the pole pieces is reduced due to leakage of the flux after core saturation is reached.

Figure 3:
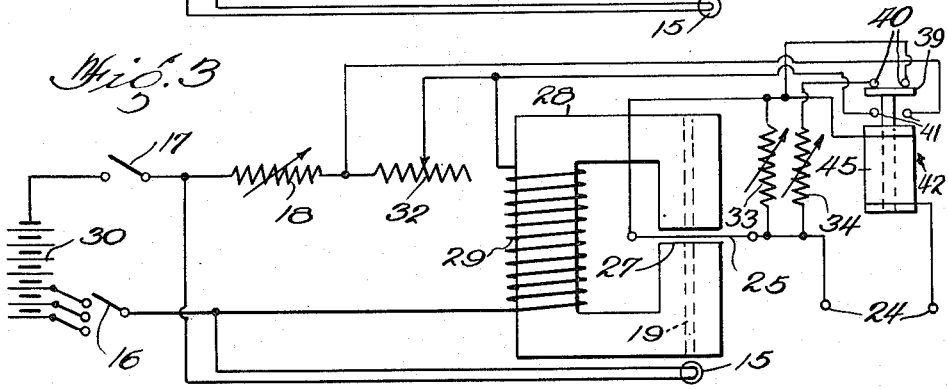
Figure 3 is a diagrammatic showing corresponding to Figure 2, but illustrating a modification thereof.

The arrangement shown in Figure 3, involving a slight modification of the circuit shown in Figure 2, is quite similar to the latter with the exception that the switch 31 and 35 of Figure 2 are replaced by contactors 40 and 41 of a relay indicated generally at 42. When the record is started, the relay armature 39 is in the position in which it is shown in Figure 3, and the instrument exhibits its minimum sensitivity. On the arrival of high amplitude energy, the relay winding 45, which is connected in the signal circuit, is energized to displace the armature 39 to open the contacts 41 and to close the contacts 40. The resistance 32 is thus shorted out, an increased voltage being thereby supplied to the winding 29, and the shunt resistance 34 is removed from the circuit, so that increased energy is delivered from the amplifier to the string 25. Gradual increase of the field strength follows, as hereinbefore described. Obviously this arrangement effects no function which could not be performed by the skilled operator through manipulation of the switches 31 and 35 of Figure 2, but renders the device automatically responsive to variation in the incoming signal for establishing a corresponding variation in the sensitivity of the apparatus.

If desired, the armature 39 can be yieldingly urged to the initial position, for example, by means of a spring, and latched in the ultimate position in which the resistance 32 is shorted. Alternatively, the relay may be constructed as shown in my prior applications hereinbefore mentioned so as to function to initiate increase of field strength immediately following, rather than on arrival of, the high intensity waves.

It will be appreciated that the use of a selective shunt resistance 34 across the galvanometer string 25 is merely an adjunct to the principal method of control by establishment of the desired strength of galvanometer field and may, under some conditions, be omitted entirely without materially affecting the result achieved. However, it can be shown that the damping introduced by the shunt resistance 34 during the arrival of the initial high amplitude energy favors energy of lower frequency, and it is found that such emphasis on the lower frequencies is useful, especially since both the amplitude and the frequency of such energy appear to vary inversely with the distance from the shot point, and greater response to energy of less amplitude is, of course, desirable. Thus in the preferred embodiment of the invention, the low frequency energy is initially favored, the shunt resistance 34 is then removed from the circuit so as to provide increased response to energy of higher frequency, and during subsequent reception and recording, the apparatus becomes increasingly responsive to lower frequencies as the field strength increases.

It will also be appreciated that the galvanometer may be considered either as part of an amplifying means or as part of a recording means, since it assists in the performance of both functions. Thus the amplitude of swing of the galvanometer string in response to seismic impulses of fixed amplitude may be varied over a wide range in the manner hereinbefore pointed out, the level of the energy output of the system being in effect raised or lowered by variation of the galvanometer field strength. The galvanometer thus functions much in the same manner as a thermionic valve, the energy supplied locally to the valve serving to vary the signal strength and the energy supplied to the galvanometer field serving to vary the mechanical deflection of the string which is representative of the signal strength. On the other hand, the string functions in conjunction with the optical system and sensitized sheet, which constitute, strictly speaking, the recording means, in the making of the record.

As hereinbefore explained, the gradual increase in field strength of the galvanometer may be utilized for the purpose of compensating for the characteristic downward shift in frequency of reflected wave energy with time. Thus it can be shown that as the field strength increases, the electrical damping of string displacements representing impulses of higher frequency increases at a much more rapid rate than the damping of string displacements representing impulses of lower frequency. Consequently, if we assume that the galvanometer field gradually increases from a minimum to a maximum, it follows that the relative response of the instrument to lower frequencies is correspondingly increased. Thus it is possible by means of the instant invention to so construct and adjust the instrument that at any given instant, that range of frequencies which includes the predominant frequencies of the arriving reflected waves is favored, with resultant increase in sensitivity of the instrument to desired components of the received energy and reduction of response to undesired components. Toward the end of the record, for example, when energy of lower frequency is favored, the response to interfering energy resulting from wind noise and other extraneous sources is minimized.

It is obvious that the interval of time during which the frequency response of the galvanometer is varied corresponds to the interval of time over which the field current is changing, and adjustment of the instrument in the manner hereinbefore described may be effected to regulate the duration of the change in frequency response. Furthermore, since the rate at which the frequency response is altered depends largely on the rate at which the field strength is changed, adjustment as hereinbefore described to change the build-up of the field permits fairly wide variation of the rate of change of frequency response. A number of other factors may, however, be altered so as to provide, under any given set of conditions, a frequency response which is automatically altered so as to compensate adequately for the shifting frequency of the arriving reflected energy.

For example, since the total field strength, and the lapse of time required to build up that field strength, can be predetermined by suitable adjustment of the resistances 18 and 32 and the voltage source 30, these values may be initially so chosen that at the instant of arrival of reflections from a bed of given depth, the instrument will afford the maximum response to desired or predominant frequencies of that reflected energy. Again, other factors such as the tension, mass, length of the string, and the resistance in shunt with the string may be adjusted to vary the frequency response over the entire range of usable frequencies, and by suitable regulation of these and still further factors, practically any desired relationship between frequency response and time may be established.

Thus the galvanometer strings are necessarily resonated above one hundred cycles in order to maintain adequate tension to prevent clashing of adjacent strings, to provide adequate restoring force so that the strings will return to normal position following deflection in response to an impulse, and in order that the deflection may be fairly linear with respect to the actuating current. When fairly low electrical damping is employed, for instance by selection of a shunt resistance of sufficiently high value, such as thirty ohms or more, the galvanometer is appreciably more sensitive to the resonant frequency of the string than to lower frequencies. By suitable adjustment of this shunt resistance, or of other constants, increased sensitivity to any desired frequency may be afforded. Thus my invention contemplates emphasizing either the highest usable frequencies, under certain operating conditions, or the lowest usable frequencies, under other operating conditions; however, emphasis on intermediate frequencies within the usable range is ordinarily preferred in order to obtain a record of maximum interpretive clarity.

In its broader aspect, the invention contemplates a method of and apparatus for frequency discrimination in seismic reception with respect to time, and is not necessarily limited in its application to the preferred embodiment illustrated herein. Obviously the desired frequency discrimination can be obtained at various points in the conventional seismic responsive system, which comprises generally the seismometer, the amplifier, and the recorder.

Having thus described the invention, what is claimed as new and desired to be secured by Letters Patent is:

1. In apparatus for recording seismic waves, the combination with means for receiving and transforming seismic waves into electrical wave form signals, of an amplifying and recording system for said signals, said system including means operable automatically to vary in respect to time the relative response of said system to signals of different frequency.

2. In apparatus for recording seismic waves, a system comprising means for receiving and transforming seismic waves into electrical wave form signals, and means for amplifying and recording said signals, said system including means operable to vary in a predetermined relation with time the relative response of the system to waves of different frequency.

3. In apparatus for recording seismic waves, a system comprising means for receiving and transforming seismic waves into electrical wave form signals, and means for amplifying and recording said signals, said system including means operable automatically during reception of the seismic waves to increase in a predetermined relation to time the response of said system to waves of lower frequency with respect to waves of higher frequency.

4. In apparatus for recording seismic waves, the combination with means for receiving and transforming seismic waves into electrical wave form signals, of an amplifying and recording system for said signals, said system including means operable to vary in a predetermined manner and over a predetermined time interval the relative response of said system to signals of different frequency, and means associated with said last named means for regulating the operation thereof to adjust the length of said time interval.

5. In apparatus for recording seismic waves, a system comprising means for receiving and transforming seismic waves into electrical wave form signals, and means for amplifying and recording said signals, said system including means operable to vary in a predetermined relation with time the relative response of the system to waves of different frequency, and means associated with said last named means for regulating the operation thereof to adjust the rate of variation of such relative response.

6. In apparatus for recording seismic waves, a system comprising means for receiving and transforming seismic waves into electrical wave form signals, and means for amplifying and recording said signals, said system including means operable to increase gradually and over a predetermined period of time the response of said system to waves of lower frequency with respect to waves of higher frequency.

7. A method of geological exploration including the steps of creating elastic waves in the earth, translating into electrical impulses the waves so created, and amplifying and recording a band of frequencies affording a usable amplitude of wave trace and simultaneously varying the relative amplitude of the trace of impulses of different frequency as a function of the time elapsed after the arrival of the initial elastic wave.

8. A method of geological exploration including the steps of creating elastic waves in the earth, translating into electrical impulses the waves so created, and amplifying and recording a band of frequencies affording a usable amplitude of wave trace and simultaneously increasing the amplitude of the trace of low frequency impulses with respect to the trace of high frequency impulses as a function of the time elapsed after the arrival of the initial elastic wave.

9. In recording elastic earth vibrations, the method of securing a record which for successive moments of the period for which said vibrations persist records the vibration at an amplitude presenting maximum interpretive clarity which consists in converting said earth vibrations into electric vibrations, amplifying and recording said electric vibrations over the period during which said vibrations persist and simultaneously varying the relative recorded amplitude of vibrations of different frequency in such a manner that during the initial part of said period the vibrations of the relatively higher frequency portion of the vibration spectrum are recorded at an amplitude which is large relative to the recorded amplitude of the lower frequency portion of said spectrum, and during the terminal portion of said period the vibrations of the relatively lower frequency portion of said spectrum are recorded at an amplitude which is large relative to the recorded amplitude with which the higher frequency portion of said spectrum is amplified.

10. In recording elastic earth vibrations, the method of securing a record which for successive moments of the period for which said vibrations persist records the vibration at an amplitude presenting maximum interpretive clarity which consists in converting said earth vibrations into electric vibrations, amplifying and recording said electric vibrations over the period during which said vibrations persist and simultaneously varying the relative recorded amplitude of vibrations of different frequency in such a manner that starting with the initial instant of said period the recorded amplitude of a given frequency in the spectrum of said vibrations varies continuously as a function of the elapsed portion of said period in such a manner that over the initial portion of said period the high frequencies are recorded at an amplitude relatively higher than the low frequencies, and that over the terminal portion of said period the low frequencies are recorded at an amplitude relatively higher than the high frequencies.

11. In apparatus for recording seismic waves, the combination with a system including means for receiving and transforming seismic waves into electrical wave form signals, of amplifying and recording means for said signals, said recording means including devices operable to increase gradually and over a predetermined period of time the response of said system to waves of lower frequency with respect to waves of higher frequency.

12. In apparatus for recording seismic waves, the combination with a system including means for receiving and transforming seismic waves into electrical wave form signals, of amplifying and recording means for said signals, said recording means including devices operable to increase gradually and over a predetermined period of time the response of said systems to waves of lower frequency with respect to waves of higher frequency, and means associated with said last named means for regulating the latter to adjust the rate of increase of relative response to lower and higher frequencies.

13. In a recording galvanometer of the type provided with a moving element which is displaced in a magnetic field to an extent determined by the current flowing in the moving element, means for applying to said moving element a fluctuating current, the frequency of the wanted component of which decreases over a period of time, a field winding for establishing said magnetic field, a direct current source for energizing said winding, the self-inductance of said winding being such that on energization thereof the magneto-motive force of the field builds up at such a rate that the response to current of low frequency increases over said period of time with respect to current of higher frequency, and means for regulating the rate at which said field builds up.

14. A method of geological exploration including the steps of creating elastic waves in the earth, translating into electrical impulses the waves so created, and amplifying and recording such band of frequencies including the highest frequencies of the electrical impulses as will provide a usable amplitude of wave trace and simultaneously varying the frequency amplification characteristic to lower the lower limit of said band of frequencies so amplified as a function of the time elapsed after the arrival of the initial elastic wave.

15. In recording elastic earth vibrations, the method of securing a record which for successive moments of the period for which said vibrations persist records the vibration at an amplitude presenting maximum interpretive clarity which consists in converting said earth vibrations into electric vibrations, amplifying said electric vibrations over the period during which said vibrations persist and simultaneously changing the frequency characteristic of amplification in such a manner that during the initial part of said period the vibrations of the relatively higher frequency portion of the vibration spectrum are amplified with an amplification factor large relative to the amplification of the lower frequency portion of said spectrum, and during the terminal portion of said period the vibrations of the relatively lower frequency portion of said spectrum are amplified with an amplification factor large relative to the amplification factor with which the higher frequency portion of said spectrum is amplified, and recording the electrical vibrations so amplified.

16. In recording elastic earth vibrations, the method of securing a record which for successive moments of the period for which said vibrations persist records the vibration at an amplitude presenting maximum interpretive clarity which consists in converting said earth vibrations into electric vibrations, amplifying said electric vibrations over the period during which said vibrations persist and simultaneously changing the frequency characteristic of amplification in such a manner that starting with the initial instant of said period the amplification factor of a given frequency in the spectrum of said vibrations varies continuously as a function of the elapsed portion of said period in such a manner that over the initial portion of said period the high frequencies are amplified relatively more than the low frequencies, and that over the terminal portion of said period the low frequencies are amplified relatively more than the high frequencies, and recording the electrical vibrations so amplified.

17. In seismograph prospecting, the method of amplifying and recording seismophone signals of fluctuating amplitude and of various frequencies corresponding to terrestrial vibrations and varying with time, some of which signal frequencies it is desired to record and others to suppress, which method comprises amplifying the signals in a circuit having a variable selective frequency response, changing the frequency response as a predetermined function of time independently of fluctuations in signal amplitude so as to keep the circuit tuned for the desired signal frequencies, and recording the selected amplified signals.

18. A method of seismograph prospecting which comprises producing seismophone signals of fluctuating amplitude and of varying frequencies corresponding to terrestrial vibrations, which signal frequencies vary with time, amplifying the signals in a tuned circuit, and varying the tuning of the circuit as a predetermined function of time, during receipt of the signals, independently of fluctuations in signal amplitude, so as to select from the seismophone signals those signal frequencies which correspond to reflections or refractions from buried strata.

19. In recording elastic earth vibrations, the method of securing a record which for successive moments of the period for which said vibrations persist records the vibrations at an amplitude presenting maximum interpretive clarity which consists in converting said earth vibrations into electric vibrations, amplifying said electric vibrations over the period during which said vibrations persist and simultaneously changing the frequency characteristic of amplification in such a manner that during an initial brief moment of said period the vibrations of lower frequency are emphasized and that starting with the initial instant of the portion of said period remaining after said initial brief moment the amplification of a given frequency in said spectrum varies continuously as a function of the time elapsed since the initial instant of said remaining portion and in such a manner with frequency that immediately after said initial instant of said remaining portion the high frequencies are amplified substantially relatively more than the low frequencies and over the terminal part of said remaining portion the low frequencies are amplified substantially more than the high frequencies, and recording said electrical vibrations so amplified.

OLIVE S. PETTY.